United States Patent
Svorcan

(10) Patent No.: US 11,661,156 B2
(45) Date of Patent: May 30, 2023

(54) APPARATUS AND METHOD FOR COLLECTING MARINE DEBRIS

(71) Applicant: TECHNIKA ENGINEERING LTD., Calgary (CA)

(72) Inventor: Radé Svorcan, Calgary (CA)

(73) Assignee: Technika Engineering Ltd., Calgary (CA)

( * ) Notice: Subject to any disclaimer, the term of this patent is extended or adjusted under 35 U.S.C. 154(b) by 146 days.

(21) Appl. No.: 17/299,229

(22) PCT Filed: Dec. 2, 2019

(86) PCT No.: PCT/CA2019/051728
§ 371 (c)(1),
(2) Date: Jun. 2, 2021

(87) PCT Pub. No.: WO2020/113320
PCT Pub. Date: Jun. 11, 2020

(65) Prior Publication Data
US 2022/0041256 A1    Feb. 10, 2022

Related U.S. Application Data

(60) Provisional application No. 62/774,466, filed on Dec. 3, 2018.

(51) Int. Cl.
*E02B 15/04* (2006.01)
*B63B 35/32* (2006.01)
(Continued)

(52) U.S. Cl.
CPC .............. *B63B 35/32* (2013.01); *B63H 1/12* (2013.01); *B63H 21/17* (2013.01); *C02F 1/40* (2013.01);
(Continued)

(58) Field of Classification Search
CPC .... E02B 15/045; E02B 15/046; E02B 15/047; E02B 15/048; E02B 15/10; E02B 15/104; E02B 15/105; B63B 35/32
(Continued)

(56) References Cited

U.S. PATENT DOCUMENTS 3,618,768 A * 11/1971 Brown .................. E02B 15/105
                                                            210/776
3,700,108 A * 10/1972 Richards .............. E02B 15/104
                                                            210/242.3
(Continued)

FOREIGN PATENT DOCUMENTS

CN        10962266        1/2019
WO       2006037829       4/2006

OTHER PUBLICATIONS

The Wayback Machine, "The Ocean Cleanup" http://web.archive.org/web/20180806101114/https://www.oceancleanup.com/, Aug. 6, 2018.
(Continued)

*Primary Examiner* — Christopher Upton
(74) *Attorney, Agent, or Firm* — Davis Wright Tremaine LLP; Heather M. Colburn

(57) ABSTRACT

An apparatus for collecting floating marine debris comprises a frame, a debris collection container in communication with a rear opening of the frame, a pair of helicoidal screws mounted to the frame in a symmetrical V-arrangement that tapers inwardly from a front opening of the frame to the rear opening, and at least one prime mover rotationally coupled to the pair of helicoidal screws. The prime mover is operable to rotate the helicoidal screws in opposite directions at the same angular velocity in water to move the apparatus forward through the water, such that floating marine debris enters the apparatus through the front opening, passes
(Continued)

Figure 1 through the rear opening and is collected in the debris collection container.

20 Claims, 8 Drawing Sheets

(51) Int. Cl.
  *B63H 1/12* (2006.01)
  *B63H 21/17* (2006.01)
  *C02F 1/40* (2023.01)
  *E02B 15/10* (2006.01)
  *C02F 103/00* (2006.01)

(52) U.S. Cl.
  CPC ............ *E02B 15/047* (2013.01); *E02B 15/10* (2013.01); *E02B 15/105* (2013.01); *B63H 2001/122* (2013.01); *B63H 2021/171* (2013.01); *C02F 2103/007* (2013.01); *C02F 2201/008* (2013.01); *C02F 2201/009* (2013.01)

(58) Field of Classification Search
  USPC ...... 210/747.6, 776, 170.05, 170.09, 170.11, 210/242.1, 242.3, 923
  See application file for complete search history.

(56) References Cited

U.S. PATENT DOCUMENTS

| | | | | |
|---|---|---|---|---|
| 3,862,904 | A | * | 1/1975 | Weatherford ......... E02B 15/046 210/776 |
| 4,151,081 | A | * | 4/1979 | Bolli ...................... E02B 15/046 210/776 |
| 4,196,087 | A | * | 4/1980 | Gordon ................. E02B 15/105 210/242.3 |
| 4,211,659 | A | * | 7/1980 | Nyfeldt ................. E02B 15/048 210/242.3 |
| 4,976,855 | A | | 11/1990 | Virtanen |
| 5,173,182 | A | * | 12/1992 | Debellian ............. E02B 15/046 210/242.1 |
| 6,117,336 | A | * | 9/2000 | Sachse .................... E02B 15/06 210/776 |
| 8,911,632 | B2 | | 12/2014 | Jarvinen |
| 2012/0055856 | A1 | * | 3/2012 | Ratti ..................... E02B 15/104 210/242.1 |

OTHER PUBLICATIONS

International Search Report and Written Opinion, dated Mar. 5, 2020, received in International Application No. PCT/CA2019/051728.

\* cited by examiner

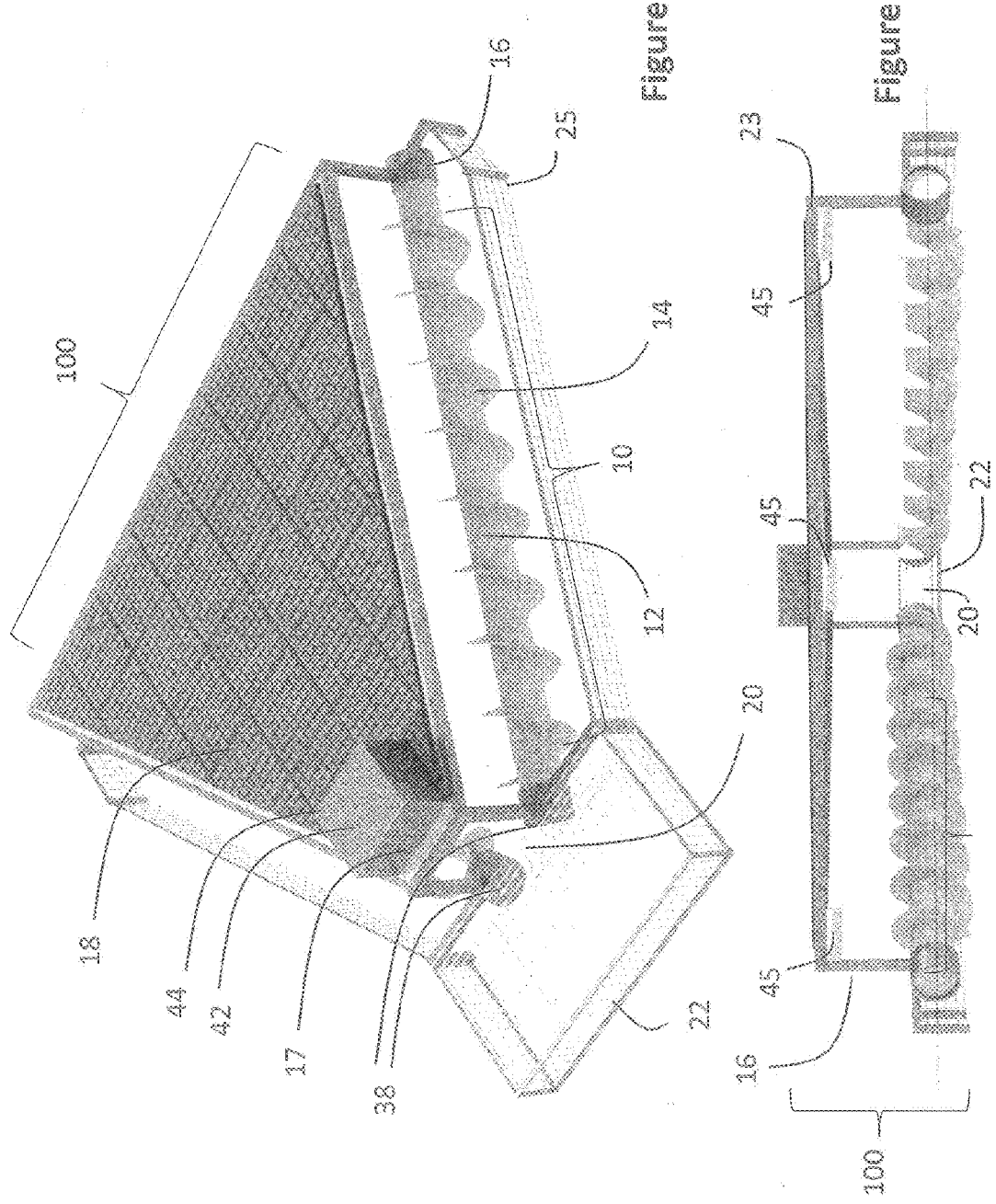

APPARATUS AND METHOD FOR COLLECTING MARINE DEBRIS

CROSS-REFERENCE TO RELATED APPLICATIONS

The present application is a U.S. National Stage entry under 35 U.S.C. § 371 of International Application No. PCT/CA2019/051728, filed on Dec. 2, 2019, designating the United States of America and published in English on Jun. 11, 2020, which in turn claims priority to U.S. Provisional Patent Application No. 62/774,466, filed on Dec. 3, 2018, each of which is hereby incorporated by reference in its entirety.

FIELD

This disclosure relates generally to an apparatus and a method for collecting marine debris.

BACKGROUND

Solid and liquid debris, such as spilled oil and discarded plastic, that is free floating in lakes, seas and oceans present one of the biggest ecological issues of today. Based on published data, more than eight million tons of plastic is dumped into oceans every year. At the current rate, it is predicted that by 2050 the amount of plastics in the ocean will outweigh the amount of fish.

After plastic has been disposed in water, it disintegrates into micro-plastic particles that enter many aspects of ecosystem. Plastic is commonly found in fish, and according to some sources, more than 90% of seabirds have plastic in their digestion system. Microplastics has been found on top of mountain ranges, high Artic and in the ocean's deepest points.

In large open waters plastic is driven by water currents into an area in the center of the current, therefore forming a so-called "garbage patch". Plastic is also commonly found in large amounts at shores near populated areas or at mouths of rivers that flow through populated areas.

Currently, many known systems for collecting plastic and other marine debris are designed to be pushed by a manned vessel, such as a boat. These systems typically involve a pair of sweeping arms that are positioned to collect debris while being pushed by the vessel. A significant limitation of these systems is the resistance to their movement imposed by water against the surfaces of the sweeping arms, and by water "trapped" within the envelope of the sweeping arms. This "trapped" water is pushed together with the sweeping arms, therefore increasing the load on the arms and the drive power requirements. The overall resistance to movement of the sweeping arms increases rapidly with the increase in size of the system, and on a larger scale the application of such systems becomes impractical due to power requirements and magnitude of loads imposed onto the arm's structure. Additionally, these systems for collecting plastics require significant involvement of manpower which results in increased cost of the operation of the system.

Besides sweeping arms, it is also known to use booms mostly as a permanent barrier to control the movement of marine debris and prevent movement of debris into protected areas. However, such booms are not commonly used for collection of marine debris.

Another known concept for collection of marine debris from ocean "garbage patches" involves a passive system that essentially contains a long barrier that is positioned on the water surface (ref. www.oceancleanup.com). This system relies upon a difference between its drifting velocity on the water surface and drifting velocity of debris, so that debris gathers in front or behind it. This is a non-powered, passive system which has limited applications; in particular, these systems are primarily intended for operations in large open water areas, and not necessarily in coastal zones. The debris concentrated behind this artificial barrier will eventually be collected by other means, such as a human operated vessel.

There is therefore an opportunity for improvement to known methods and apparatuses for collecting marine debris from open water surfaces.

BRIEF DESCRIPTION OF FIGURES

FIG. 1 is a perspective view of a marine debris collecting apparatus according to a first embodiment of the invention.

FIG. 2 is a front elevation view of the marine debris collection apparatus in FIG. 1

SUMMARY

Figure 3:
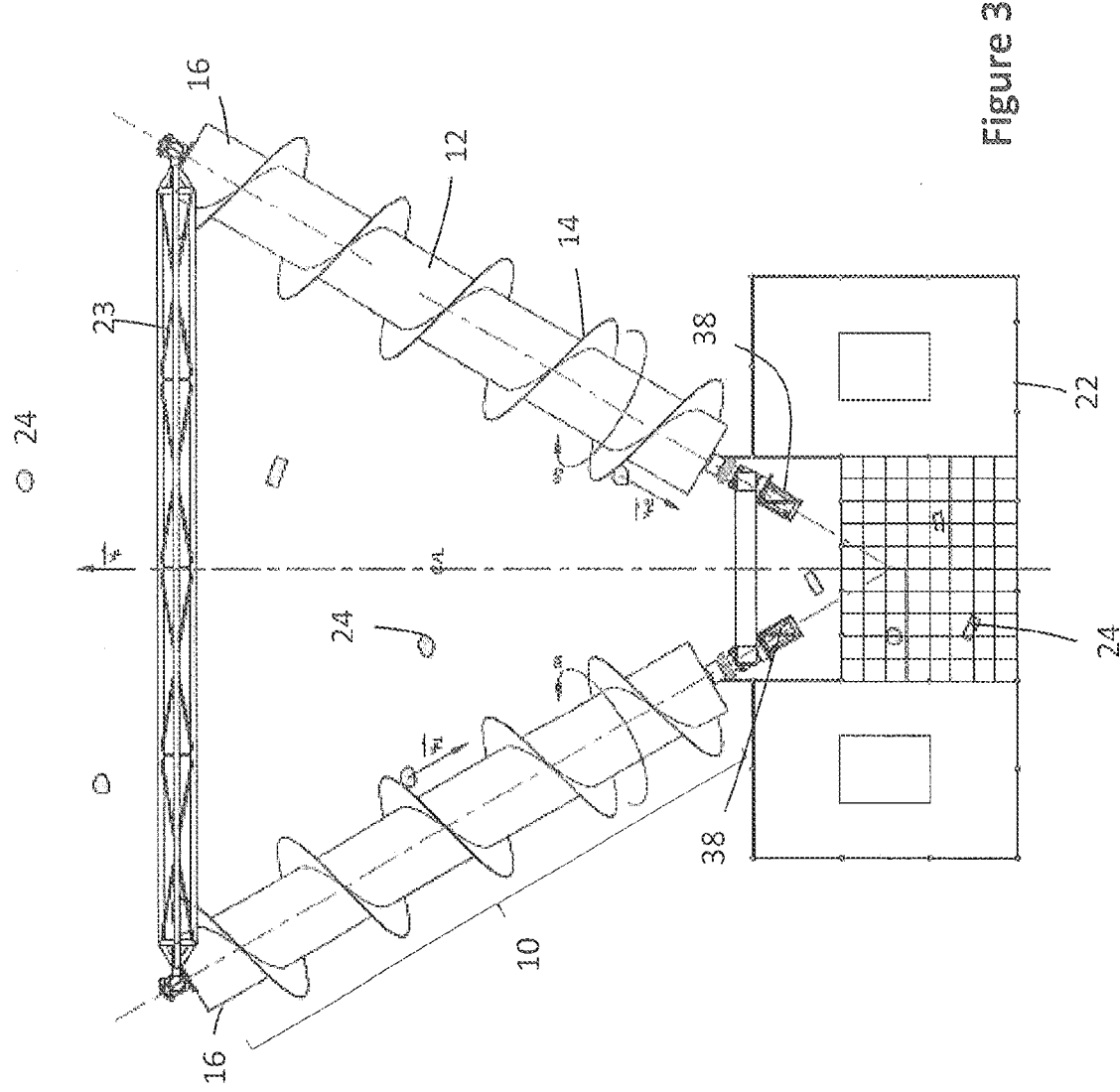
FIG. 3 is a top schematic view of the marine debris collection apparatus showing a pair of helicoidal screws.

According to one aspect, there is provided an apparatus for collecting floating marine debris comprising: a frame having a front opening and a rear opening; a debris container in communication with the rear opening; a pair of helicoidal screws mounted to the frame in a symmetrical V-arrangement that tapers inwardly from the front opening to the rear opening; and at least one prime mover rotationally coupled to each of the helicoidal screws. The pair of helicoidal screws can have a buoyancy sufficient to float the apparatus in water and can also each comprise threads with an Archimedes' screw geometry. The helicoidal screws can be configured such that one screw serves as the "left" orientation of the helicoid, and the other screw serves as the "right" orientation of the helicoid, so that the two helicoidal screws form a symmetrical arrangement with respect to the centerline of the apparatus. The prime movers are operable to rotate the helicoidal screws in opposite directions and at the same angular velocity to move the apparatus forward through the water, such that floating marine debris enters the apparatus through the front opening, passes through the rear opening and is collected in the debris container.

When the two helicoidal screws are rotated at a different rate of rotation, the apparatus will turn around its vertical axis and change trajectory of its travel. The grade at which the apparatus turns around its vertical axis will correspond to the difference between the rate of rotation of each helicoidal screw. This enables effective control of the travel trajectory of the apparatus through appropriate adjustment of the rate of rotation of each helicoidal screw.

The prime movers can be electrically or hydraulically powered drive motors, in which case the apparatus further comprises a battery pack electrically coupled to the drive motors or the motors' hydraulic power unit, and at least one solar panel electrically coupled to the drive motor(s) or the battery pack.

The apparatus can further comprise a control unit communicative with the prime mover and comprise a transceiver configured to at least receive instructions to operate the prime mover. Additionally or alternatively, the control unit can comprise a processor and a memory having encoded thereon program code executable by the processor to instruct the prime mover to move the apparatus along a defined course across a target area of water.

The apparatus can also be provided with a set of monitoring and control instruments to enable its safe interface with sea traffic and the marine life in case of its remote or unmanned operation. These instruments can include thermal imaging and infrared technology, motion detectors and artificial intelligence systems to detect marine life; as well as signaling and communication devices for interface with the sea traffic.

According to another aspect, there is provided a method for collecting floating marine debris, comprising: positioning a pair of helicoidal screws in water in a symmetrical V-arrangement that tapers inwardly to define a front opening and a rear opening that is narrower than the front opening; rotating the pair of helicoidal screws in opposite directions at the same angular velocity in water, such that the helicoidal screws move forward through the water and towards floating marine debris; and collecting the floating marine debris passing through the front opening and rear opening in a debris container in communication with the rear opening

DETAILED DESCRIPTION OF EMBODIMENTS

Embodiments of the invention described herein relate to an apparatus and method for collecting floating marine debris from surfaces of open water bodies such as lakes, seas, river deltas and oceans. The debris may include liquids and solids, and include oil spills, plastic, fishing gear and other man-made materials that are found free-floating on water surfaces. In the illustrated embodiments, the apparatus and method are configured to collect solid debris. Alternatively, the apparatus and method may also be adapted for use in collecting organic growth from water surfaces.

The apparatus generally comprises two helicoidal screws each having an Archimedes' screw geometry and mounted to a frame in a "V" arrangement that tapers inwardly from a front opening to a rear opening of the apparatus, a prime mover coupled to each helicoidal screws, and a collected debris container connected to the rear opening of the apparatus. The helicoidal screws are designed to be about half submerged. The helicoidal screws are configured to have an opposite orientation of the screw thread, which results in the helicoidal threads having a symmetrical arrangement with respect to the center line of the apparatus. The helicoidal screws are maintained at a predetermined submergence level by their own buoyancy, and if necessary with auxiliary buoyancy elements coupled to the ends of the helicoidal screws. The prime mover can be one or more electric drive motors in which case the apparatus can include a battery pack and optionally solar panels to charge the battery pack.

Furthermore, the apparatus can be provided with a control unit comprising a transceiver for communicating with a remotely located operator. Additionally or alternatively, the control unit can comprise a processor with a memory having stored thereon executable program files that are executed by the processor to autonomously operate the apparatus along a defined course and across a defined target area.

The apparatus can also be provided with a set of monitoring and control instruments to enable its safe interface with sea traffic and the marine life in case of its remote or unmanned operation. These instruments can include thermal imaging and infrared sensors, motion detectors and artificial intelligence systems to detect marine life; as well as signaling and communication devices for interfacing with sea traffic.

In normal operation, the two helicoidal screws are operated to rotate at the same angular velocity but in opposite directions. This rotation causes the apparatus to move in a straight line through the water, as the vector sum of the forces caused by interaction between the helicoidal threads and water results in a propulsion force that propels the system longitudinally alongside its centerline, with the wide end, or the "mouth" of the "V" arrangement facing the direction of travel. The direction of the apparatus can be controlled by appropriate adjustments in the rate of rotation of one helicoidal screw relative to the other. As the apparatus moves along the water, debris floating on the water surface will enter the mouth and into a "V" envelope between the helicoidal screws. When the debris contacts the rotating helicoidal screws, the helicoidal screws drive the debris towards the back of the of the "V" envelope via Archimedes' screw action, where the debris is collected in the debris container.

Because movement of the apparatus through water is based on a "threading" effect, in contrast to being forced together with trapped water in manners known in the art, the apparatus is expected to provide an efficient and effective method of debris collection. When the apparatus is provided with a renewable power source such as solar panels and is programmed to operate autonomously, the apparatus can be operated emissions-free and without human intervention to collect marine debris.

Additionally, the apparatus is designed such that buoyancy support, propulsion, and collection of debris are all provided by the pair of helicoidal screw elements. Integration of these functions is expected to provide a significant simplicity of design, relatively low fabrication cost and increased operational reliability, which are all advantages over systems currently known in the art.

Referring to FIGS. 1 to 10 and according to a first embodiment, an apparatus 100 comprises two helicoidal screws 10, each comprising a driveshaft 12, and threads 14 extending between the ends of the driveshaft 12. Each helicoidal screw 10 contains an equal number of helicoidal threads 14 "n". The threads 12 have a geometry of an Archimedes' screw. The threads 12 on one helicoidal screw 10 have a "right" orientation, and the threads 12 on the other helicoidal screw 10 have an opposite "left" orientation. The "right" orientation depicts the screw that advances on the helicoid as it turns in the clockwise direction, and the "left" orientation depicts the screw that advances on the helicoid as it turns in the counterclockwise direction. The two helicoidal screws 10 are mounted to a frame 16 in a "V" formation symmetrical to each other with respect to the center line of the apparatus 100, at an angle "a" from the center line of the apparatus 100 (see FIG. 3), wherein the wide end of the frame 16 is herein referred to the forward end of the apparatus 100 and the narrow end of the frame 16 is herein referred to the rear end of the apparatus 100. The narrow end of the frame 16 has an opening 20 and a debris container 22 is connected to the frame 16 at the opening 20.

Figure 7:
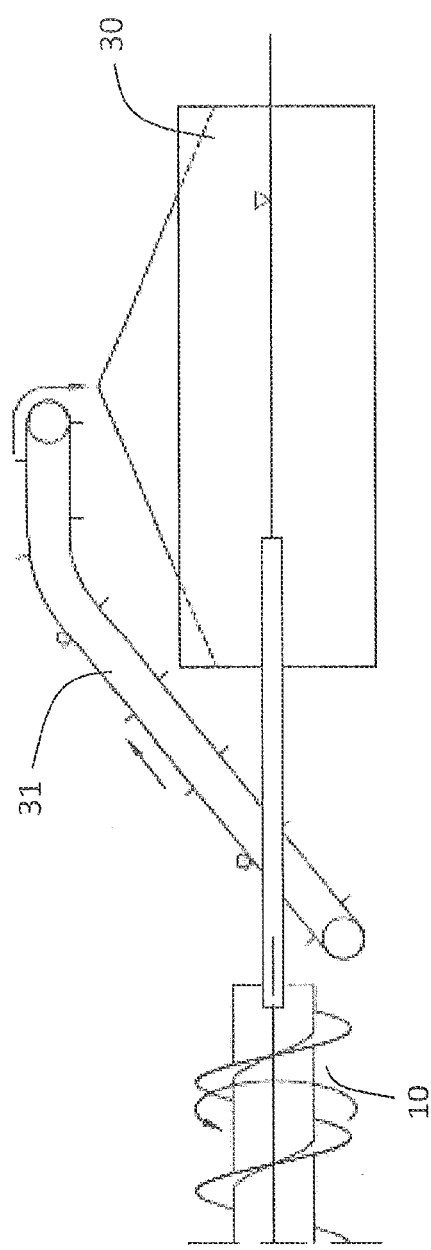
FIG. 7 is a schematic side elevation view of a debris storage system that is furnished to the marine debris collecting apparatus shown in FIG. 1, according to another embodiment.

The debris container 22 serves the purpose of containing collected debris 24 to facilitate its transfer to a shore-based facility for processing or disposal. The debris container 22 may have several design options, depending on the nature of the operations of the apparatus 100. For instance, as shown in FIG. 1 the debris container 22 may comprise a perforated enclosure or an exchangeable net for collecting solid debris. In some applications, such as shown in FIG. 7, the debris container 22 may comprise a dry storage receptacle 30 such as a barge, and an inclined conveying device 31 furnished at a rear end of the apparatus 100 for transfer of debris collected from the water into the dry storage receptacle 30. The conveying device 31 may be hydraulically driven by the hydraulic power unit of the prime movers 38, or may be comprise an electric motor that is powered directly by the batteries 40.

Figure 8:
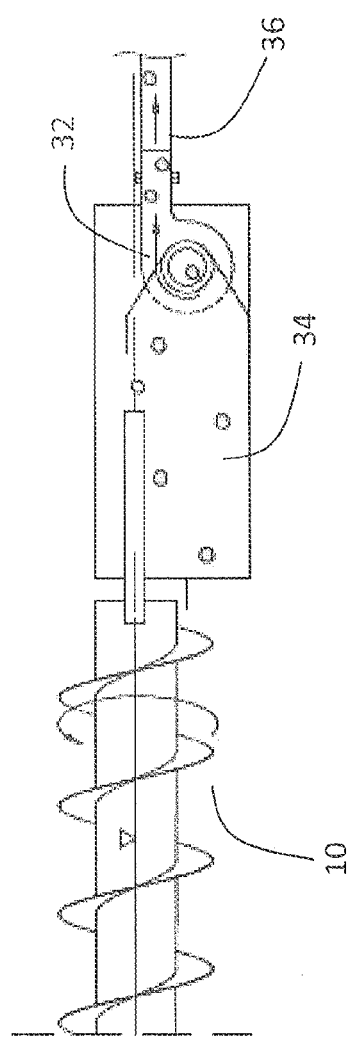
FIG. 8 is a schematic side elevation view of a debris storage and debris transfer system that is furnished to the marine debris collecting apparatus shown in FIG. 1, according to another embodiment.

In another embodiment, as shown in FIG. 8, the debris container 22 may comprise a pump 32 having a suction element 34 in communication with the opening 20 and a discharge element 36 for coupling to a conduit such as a piping installation, to enable a hydraulic transfer of the collected debris through a piping installation (not shown). This arrangement may be suitable for collecting debris in highly polluted coastal areas, or for collecting spilled oil or other liquid debris. The pump may be hydraulically driven by the hydraulic power unit of the prime movers 38, or may be an electric pump that is powered directly by the batteries 40. The piping installation may discharge the collected debris into a container on the apparatus (not shown), on a nearby barge, or on shore.

In another embodiment, the debris container 22 may further include a compactor (not shown) for compacting or compressing debris into bales, which may be suitable for remote operations of the apparatus 100 where debris cannot be regularly offloaded. The compactor may comprise a hydraulic motor that is hydraulically driven by the hydraulic power unit of the prime movers 38, or may comprise an electric motor powered directly by the batteries 40. The bales may be deposited in a container (not shown) on a nearby barge, or on the apparatus itself. Alternatively, the bales may be provided with a location indicator and collected by another vessel for transfer to shore.

In some embodiments, perforated side nets 25 can be furnished on the sides of the helicoids to contain any debris 24 that may slip under the rotating helicoidal screws 10 during operation.

The helicoidal screws 10 are designed to provide the primary buoyancy for the apparatus 100, such that when the apparatus 100 is placed in water, about half of each helicoidal screw 10 is submerged. To achieve the required buoyancy, the driveshaft 12 can have a hollow bore and the thread 14 and driveshaft 12 can be fabricated from materials having a low specific gravity material such as high-density polyethylene (HDPE) or a composite such as fiber reinforced plastic (FRP). The hollow shaft 12 can also be manufactured out of recycled plastics. It would be within the knowledge of one skilled in the art to determine the required buoyancy from the design weight of the apparatus 100, the dimensions of the helicoidal screws 10 and the density of the water, and to select the dimensions and materials for the helicoidal screws 10 accordingly.

The helicoidal screws are driven by one or more prime movers 38. In one embodiment, and visible in FIG. 3, the prime movers 38 comprise a pair of hydraulically-powered drive motors coupled to a hydraulic power unit (see FIG. 3) mounted to the frame 16. The drive motors are each rotationally coupled to a respective driveshaft 12 and are operable to rotate the driveshafts 12 in the water in a manner described in further detail below. The hydraulic power unit comprises an electric motor and a hydraulic pump driven by the motor to provide pressurized fluid to the drive motors. The hydraulically power drive motors advantageously provide high mechanical torque at relatively low rates of rotation, and can be immersed in water without concern of contact with electric components. Alternatively, the prime mover(s) 38 can be electric drive motor(s), so long as means are provided to prevent water from contacting the electric drive motors (e.g. mounting the electric motors away from the water surface or locating in a watertight container).

Although this embodiment features a pair of drive motors 38, the apparatus can alternatively be provided with a single drive motor coupled to the pair of helicoidal screws 10 with gears that enable the screws to rotate at different angular velocities (not shown).

In this embodiment, power for the hydraulic power unit (or for the electric drive motors) are stored in batteries 42 mounted on top of the frame 16. A set of solar panels 18 extend across the top of the frame 16 and collect electrical energy for storage in the batteries 42. Alternatively, electric power can be generated by a fuel generator.

Figure 5:
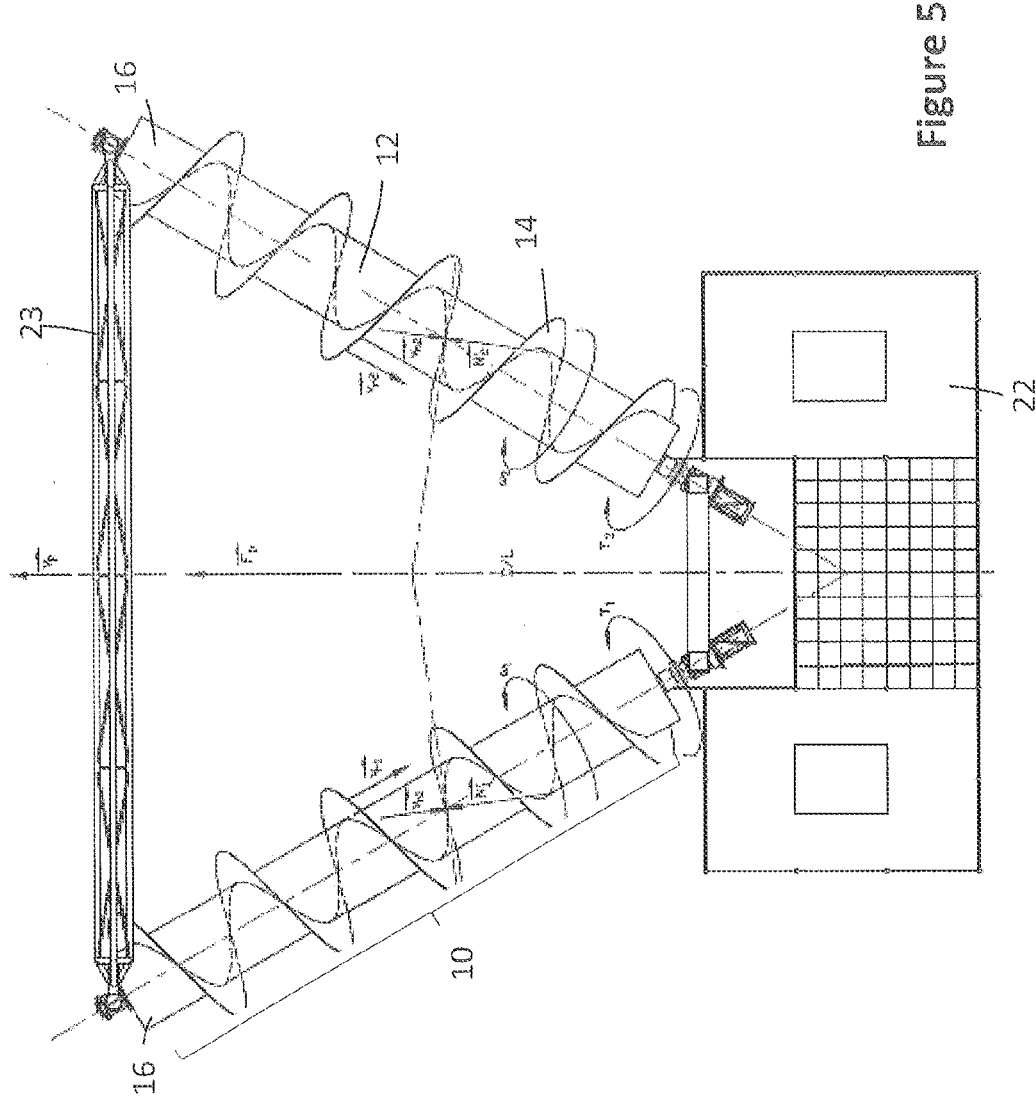
FIG. 5 is a top schematic view of the marine debris collection apparatus showing the main force and velocity vectors of the apparatus when the screws are in operation.

Referring now to FIG. 5, the prime movers 38 which are coupled to the driveshafts 12 apply drive torque $T_1$ and $T_2$ to the helicoidal screws 10 and rotate the helicoid screws 10 at a predetermined rate of rotation that correspond to their angular velocities "$\omega_1$" and "$\omega_2$". This powered rotation of the helicoidal screws 10 on water will cause interaction between the immersed portions of the helicoids and the water, and as a result provide propulsion force Fp that will propel the apparatus 100.

The propulsion force Fp is necessary to overcome the operating resistance to movement that include hydraulic drag, environmental loads that include wind, wave and current loads, and to accommodate the loads imposed onto the apparatus 100 by the debris container 22 and their operation.

The correlation between the system geometry of the helicoidal screws 10, their rate of rotation and the propulsion force Fp is discussed further below.

Figure 4:
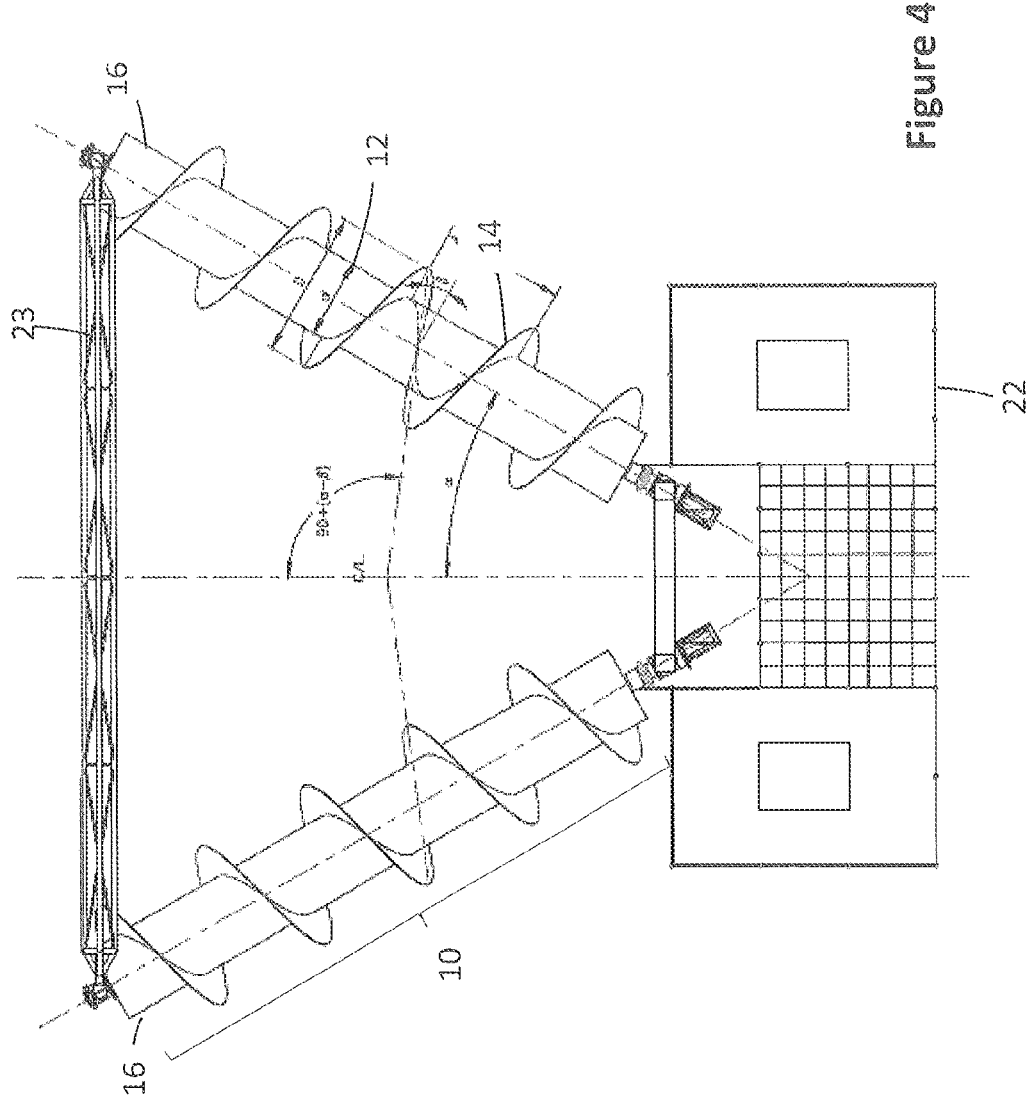
FIG. 4 is a top schematic view of the marine debris collection apparatus showing geometry parameters of the helicoidal screws.

One method of determining the nominal propulsion force Fp that can be developed by the apparatus 100 is now described with particular reference to FIGS. 3, 4 and 5. In this description, as shown in FIG. 4, the geometry of the helicoidal screws 10 are referenced by their outside diameter "D", pipe diameter "d", and pitch "b". The angle "β" of the helicoidal surface is a derivative of these parameters. The helicoidal screws 10 are positioned relative to the centerline of the apparatus at the angle "α".

For the nominal operating case in which the apparatus 100 is propelled forward, the angular velocities "$\omega_1$" and "$\omega_2$" are assumed to be of same magnitude "ω" and of the opposite directions, as indicated on FIG. 5.

Figure 9:
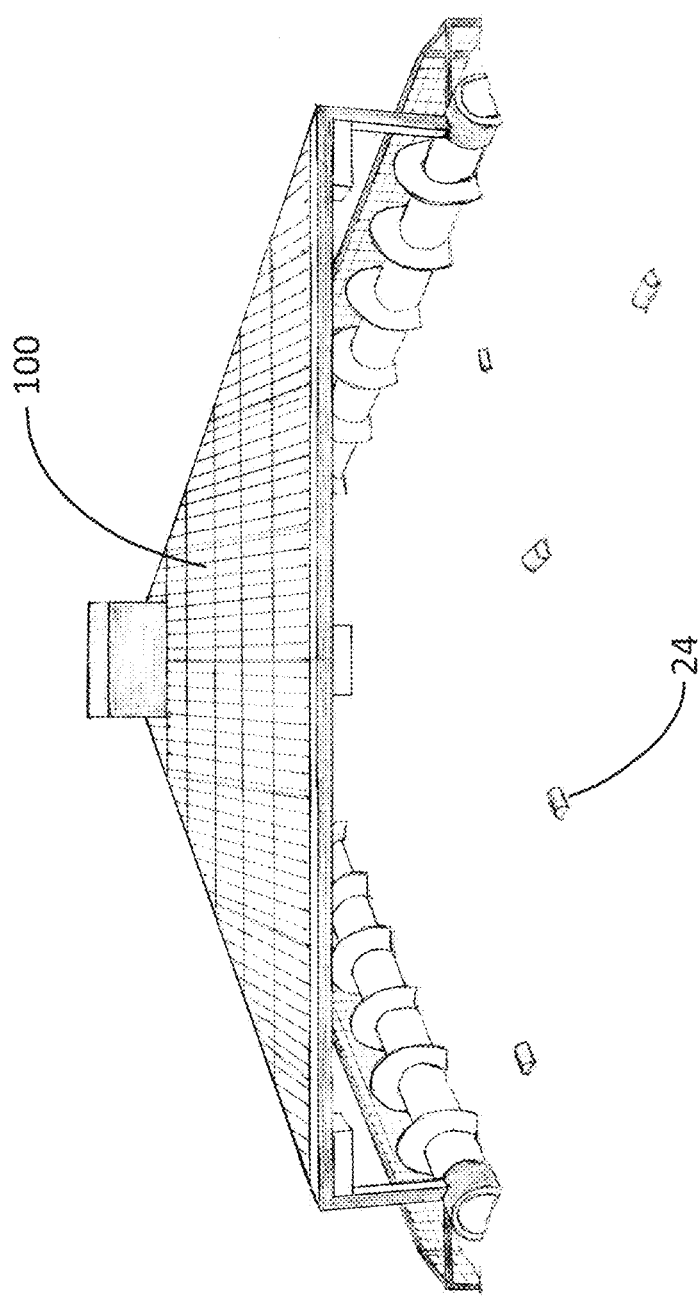
FIG. 9 is a perspective view of the marine debris collection apparatus in operation in a body of water.

For the purpose of this analysis, the helicoidal screws are considered to be half immersed in water, as illustrated in FIG. 9. The portions of the helicoids that are immersed in water form a series of identical vertical surfaces which undergo relative movement through water as each helicoid turns around its own axis. These relative movements of the immersed helicoid surfaces through water will generate forces $N_1'$ and $N_2'$ that are exerted upon the moving surfaces due to their interaction with water. The vectors of these forces are perpendicular to the corresponding surfaces.

The propulsion force Fp' produced by each pair of helicoid threads as depicted in FIG. 5 will be the vector sum of the individual forces $N_1'$ and $N_2'$. The total nominal propulsion force Fp produced by the entire apparatus 100 will be the sum of the individual propulsion forces Fp'.

Figure 6:
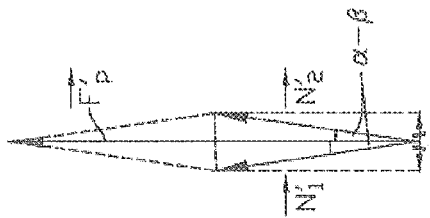
FIG. 6 is a force vector diagram of forces acting upon one pair of helicoidal screw threads of one of the helicoidal screws shown in FIG. 3 during operation of the apparatus.

As shown in FIG. 6, the vector of the propulsion force Fp', and so the vector of the total propulsion force Fp will be collinear with the center line of the apparatus 100, when the two helicoidal screws 10 of the apparatus 100 are rotating at angular velocities that are identical in their value, but having opposite directions.

The magnitude of the nominal propulsion force Fp is more specifically determined as follows:

The immersed portion of the helicoidal screw surface is oriented in relation to the center line of the apparatus 100 at an angle of "90+(α−β)", as shown in FIG. 4.

The two helicoidal screws 10 are rotated at a predetermined number of rotations per minute, that correspond to their angular velocities "$\omega_1$" and "$\omega_2$" which are same in magnitude "ω" but opposite in direction.

As the helicoidal screws 10 rotate, the immersed portions of the helicoid surface interface with water in a manner that their relative movement through water is at a rate of one pitch "b" per one rotation, as observed alongside the helicoidal screw own axis. This relative movement of immersed surfaces through water causes forces $N_1'$ and $N_2'$, whose vectors are depicted in FIG. 5.

As is known in the art, the force exerted onto a surface moving through water, in this case the moving surface being the immersed helicoidal thread 14, is calculated as:

$$N'_1 = N'_2 = \tfrac{1}{2} * A' * C_d * \rho * v_n^2$$

Where:
N$_1$', N$_2$'—the forces whose vectors are perpendicular to the immersed surface of each helicoid
A'—area of the immersed portion of a helicoidal thread
$C_d$—drag coefficient for the immersed surface
ρ—water density
$v_n$—relative velocity of the helicoidal thread surface which vector is perpendicular to the helicoidal surface.

The area A' of each portion of the helicoidal screw 10 that is immersed in water can with sufficient accuracy be expressed as:

$$A' = \frac{\pi}{8} * (D^2 - d^2) * \frac{1}{\cos(\beta)}$$

The value of the drag coefficient $C_d$ is a function of the geometry of the immersed surface, and correlation of operating parameters which in the art is known as the Reynolds Number. As is known in the art, for the set of expected operating conditions of the apparatus 100, the Cd value will range between 1 and 1.2. A more specific value of Cd can be established by experiment, or evaluated through computational fluid dynamics (CFD) modeling, in a manner that would be apparent to one skilled in the art.

The relative velocity $v_n$ for each helicoidal screw thread in water can be calculated as follows:

$$v_n = v_r * \cos(\beta)$$

Where
$v_r$—relative velocity between water and each helicoidal screw thread alongside the helicoidal screw own axis, which can be calculated as follows:

$$v_r = \frac{b * \omega}{2 * \pi}$$

therefore:

$$v_n = \frac{b * \omega}{2 * \pi} * \cos(\beta)$$

Combining the above equations, the forces $N_1'$ and $N_2'$ can be expressed as:

$$N'_1 = N'_2 = \frac{1}{64 * \pi} * C_d * b^2 * \omega^2 * (D^2 - d^2) * \rho * \cos(\beta)$$

Since the geometries of the two helicoidal screws 10 are the same, the two helicoidal screws 10 are symmetrical to each other, and the helicoidal screws 10 are rotating at the same rate of rotation, for each pair of helicoidal screws 10 a force diagram can be developed as shown in FIG. 6.

The resultant nominal propulsion force Fp' that is a vector sum of the individual forces $N_1'$ and $N_2'$ has the value of:

$$Fp' = (N'_1 + N'_2) * \cos(\alpha - \beta) =$$
$$\frac{1}{32 * \pi} * C_d * b^2 * \omega^2 * (D^2 - d^2) * \rho * \cos(\beta) * \cos(\alpha - \beta)$$

The nominal propulsion force Fp generated by the entire apparatus 100, wherein each helicoidal screw is comprised of "n" number of threads 14 can be expressed as:

$$F_p = \frac{n}{32 * \pi} * C_d * b^2 * \omega^2 * (D^2 - d^2) * \rho * \cos(\beta) * \cos(\alpha - \beta)$$

From the equation above, it can be concluded that the propulsion force Fp is maximized when the angles "α" and "β" as shown in FIG. 4 are identical in value, as this leads to the factor "cos (α−β)" be equal to one. In this case, the surfaces of the immersed portions of the helicoid threads 14 are oriented perpendicular to the line of travel, so their capacity to propel the apparatus 100 is maximized.

In case when angles "α" and "β" are identical in values, the effective propulsion force can be expressed as:

$$F_{p,max} = n * F'_p = \frac{n}{32 * \pi} * C_d * b^2 * \omega^2 * (D^2 - d^2) * \rho * \cos(\beta)$$

In the analysis indicated above and as shown in FIG. 6, the lateral projections of the force vectors $N_1'$ and $N_2'$ will cancel each other globally resulting in net zero lateral force imposed onto the system. Therefore, no lateral movement of the apparatus 100 will be caused by the reaction forces $N_1'$ and $N_2'$ in the analyzed case.

Within the apparatus structure, the lateral components of the individual force $N_1'$ and $N_2'$ vectors are accommodated as tension or compression force in a spreader bar 23 that forms a part of the apparatus frame 16.

Per the above, it can be concluded that when the apparatus 100 is operated in a manner that the two helicoidal screws 10 are rotating at the same rate of rotation but in opposite directions to each other, the apparatus 100 will be propelled in the direction of its center line, as indicated by the velocity vector $v_p$. This movement will be forward for directions of helicoidal screw rotations as noted in FIG. 5 and will move in the opposite way if the directions of rotations are reversed.

When the two helicoidal screws 10 rotate at different angular velocities, the lateral projections of the force $N_1'$ and $N_2'$ vectors will be present and the vector of the propulsion force Fp will no longer be in collinear with the center line of the apparatus 100. This will cause the propulsion force Fp to form a turning moment around the pivot point of the apparatus 100 and cause change in its direction of travel. This feature can effectively be used to control the working trajectory of the apparatus 100, by appropriate adjustment of the angular velocity of each helicoidal screw element.

Determining the power of the prime mover that is required to obtain the nominal propulsion force is discussed below:

The required running power of the prime mover can be derived as a sum of products of forces $N_1'$ and $N_2'$ multiplied by the respective velocity $v_n$ over the total number of threads 14. Through appropriate processing of the formulas derived above, the effective running power of the installed drivers can be expressed as:

$$P_e = \frac{F_p}{\cos(\alpha - \beta)} * v_n$$

The torque that is required at each driveshaft of the helicoidal screw can be derived as:

$$T_{1,2} = \frac{P_e}{2 * \omega}$$

As it is known in the art, the installed motor power needs to also accommodate for inertia load during startup, secondary loads, upset operating loads and losses in the power transmission. These aspects are not discussed herein as they are part of general engineering knowledge of those skilled in the art.

The velocity $v_p$ at which the apparatus 100 will move forward relative to water surface has the maximum theoretical value of:

$$v_{p,max} = v_r * \cos(\alpha)$$

The actual propelling velocity may be smaller, as it may be affected by the helicoid slip relative to water. The expected amount of slip for the helicoid is 30%, which would result in the propelling velocity being 70% of the theoretical maximum per the formula above. The actual value of the helicoid slip can be established by field measurements, or assessed through CFD modelling.

Operation

Figure 10:
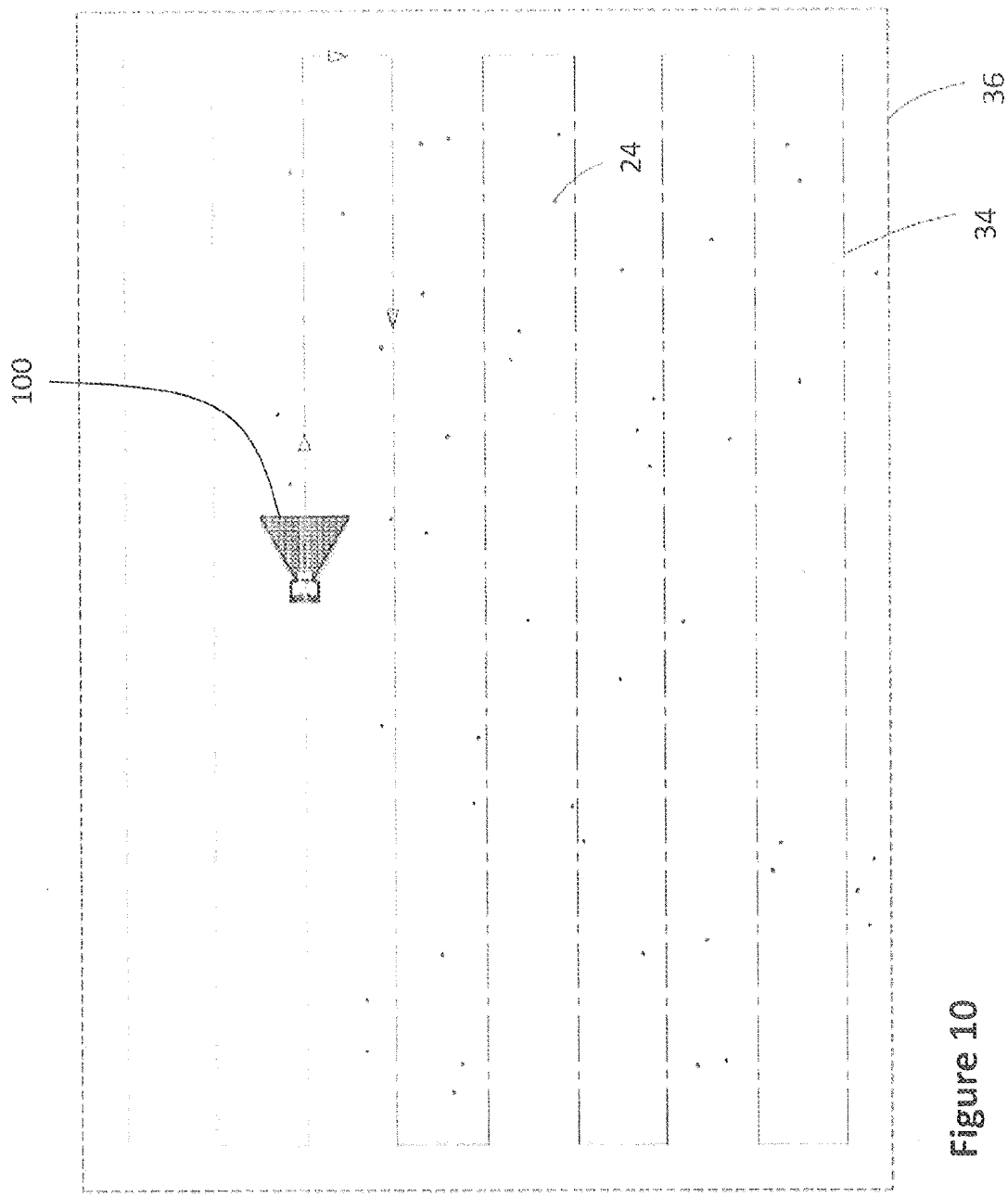
FIG. 10 is a schematic illustration of a programmed course for the marine debris collecting apparatus in a body of water over a defined area.

Referring now to FIGS. 9 and 10, the apparatus 100 can be configured for one or both of remotely controlled or autonomous operation. For remote controlled operation, a control unit 44 (see FIG. 1) is provided that is mounted on the frame 16 and communicative with the drive motors 38.

The control unit 44 may be provided with a transceiver to communicate with a remotely located operator using wireless communication means such as radio frequency or satellite signals. For example, an operator can be located on shore and communicate with the apparatus 100 via satellite transmissions. Such communication means are known in the art and thus art not described in detail here. The apparatus 100 can be provided with various sensors (not shown) such as a camera, radar, GPS radio, etc. to assist the operator in controlling the path of the apparatus 100.

The trajectory of the apparatus 100 along the water can be controlled by appropriate adjustments of the drive motors to change the angular velocities $\omega_1$ and $\omega_2$ of the helicoidal screws 10. By controlling the difference in angular velocities, the apparatus 100 can be turned to left or right, as required. When the two angular velocities are of the same magnitude and direction, the apparatus 100 will pivot about its vertical axis of rotation. This enables the apparatus 100 to be turned horizontally by any angle.

In some embodiments and as shown in FIG. 2, the apparatus 100 can also be provided with a set of monitoring and control instruments 45 to enable its safe interface with sea traffic and the marine life in case of its remote or unmanned operation. These instruments can include thermal imaging and infrared sensors, motion detectors and artificial intelligence systems to detect marine life as well as signaling and communication devices for interface with the sea traffic.

As the apparatus 100 travels along the water, pieces of debris 24 that are dispersed on the water surface are collected by the apparatus 100 and gathered into the debris container 22. As the apparatus 100 moves through the water, the debris comes into interface with a helicoidal screw 10. Once the interface between the debris and the helicoidal screw 10 has been established, the debris is moved towards the container 22 through the principle of helicoidal rotating movement, analogous to the action of an Archimedes' screw. Debris particles are therefore moved towards the back of the apparatus 100 and into the container 22.

Alternatively or additionally, the control unit 44 can be provided with a processor and a memory having encoded thereon executable program files that are executed by the processor to autonomously operate the apparatus 100. In particular, the control unit 44 can be programmed to perform a "harvesting operation" over a predefined area, while its operations can be monitored and communicated to a remote monitoring center via the transceiver.

One exemplary harvesting operation is shown in FIG. 9, wherein the apparatus 100 is programmed to travel along a defined course 34 over a rectangular target area 36. In this operation, the program files contain instructions to operate the drive motors to move the apparatus 100 in a straight line for a predefined distance, then turn the apparatus 180° so that it faces the opposite direction, move the apparatus in a straight line the same return distance; then turn the apparatus 180° in the opposite direction. This pattern can be repeated until the target area 36 has been traversed. The control unit 44 can receive sensor data such as GPS data and the processor can be further programmed to adjust operation of the drive motors to make course corrections to keep the apparatus 100 along the defined course. Such course corrections can be performed to compensate for environmental effects such as wind and waves.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. An apparatus for collecting floating marine debris, the apparatus comprising:
   (a) a frame having a front opening, and a rear opening;
   (b) a debris container in communication with the rear opening;
   (c) a pair of helicoidal screws mounted to the frame in a symmetrical V-arrangement that tapers inwardly from the front opening to the rear opening, the frame spacing apart front ends of the pair of helicoidal screws, the frame spacing apart rear ends of the pair of helicoidal screws; and
   (d) at least one prime mover rotationally coupled to the pair of helicoidal screws, and operable to rotate first and second helicoidal screws of the pair of helicoidal screws in opposite directions in water to move the apparatus forward through the water, such that floating marine debris enters the apparatus through the front opening, passes through the rear opening and is collected in the debris container.

2. The apparatus as claimed in claim 1, wherein the pair of helicoidal screws have a buoyancy sufficient to float the apparatus in the water.

3. The apparatus as claimed in claim 1, wherein the pair of helicoidal screws each comprise threads with an Archimedes' screw geometry.

4. The apparatus as claimed in claim 1, wherein the at least one prime mover comprises at least one electric drive motor.

5. The apparatus as claimed in claim 1, wherein the at least one prime mover comprises at least one hydraulic drive motor and a hydraulic power unit hydraulically coupled to the at least one hydraulic drive motor.

6. The apparatus as claimed in claim 1, wherein the at least one prime mover comprises at least one electric drive motor, or at least one hydraulic drive motor hydraulically coupled to a hydraulic power unit, and the apparatus further comprises:
   a battery electrically coupled to the at least one electric drive motor or the hydraulic power unit, and
   at least one solar panel electrically coupled to the battery.

7. The apparatus as claimed in claim 1, further comprising:
   a control unit communicative with the at least one prime mover and comprising a transceiver configured to at least receive instructions to operate the at least one prime mover.

8. The apparatus as claimed in claim 1, further comprising:
   a control unit communicative with the at least one prime mover and comprising a processor and a memory having encoded thereon program code executable by the processor to instruct the at least one prime mover to move the apparatus along a defined course across a target area of the water.

9. The apparatus as claimed in claim 1, further comprising:
   perforated side nets outboard of the first and second helicoidal screws.

10. The apparatus as claimed in claim 1, wherein the debris container comprises a perforated enclosure.

11. The apparatus as claimed in claim 1, wherein the debris container comprises a dry storage receptacle and an inclined conveying device with one end in communication with the rear opening and another end in communication with the dry storage receptacle, the inclined conveying device operable to convey debris collected at the rear opening into the dry storage receptacle.

12. The apparatus as claimed in claim 1, wherein the debris container comprises a pump with a suction means in communication with the rear opening, and a discharge means for coupling to a discharge conduit.

13. The apparatus as claimed in claim 1, wherein the debris container comprises a compactor for compacting collected debris into bales.

14. A method for collecting floating marine debris, the method comprising:
   (a) positioning a pair of helicoidal screws in water in a symmetrical V-arrangement that tapers inwardly to define a front opening and a rear opening that is narrower than the front opening, a first member spacing front ends of the pair of helicoidal screws apart from one another, a second member spacing rear ends of the pair of helicoidal screws apart from one another;
   (b) rotating the pair of helicoidal screws in opposite directions in the water, such that first and second helicoidal screws of the pair of helicoidal screws move forward through the water and towards the floating marine debris; and
   (c) collecting the floating marine debris passing through the front opening and the rear opening in a debris container in communication with the rear opening.

15. An apparatus comprising:
   (a) a debris collection area;
   (b) a first helicoidal screw comprising a first end opposite a second end;
   (c) a second helicoidal screw comprising a third end opposite a fourth end;
   (d) a spacing member spacing the first end from the third end by a first amount, the second end being spaced apart from the fourth end by a second amount that is less than the first amount; and (e) at least one prime mover connected to the first and second helicoidal screws, the at least one prime mover being operable to rotate the first and second helicoidal screws to propel the first and second helicoidal screws through liquid and cause floating debris to be moved by the first and second helicoidal screws toward the debris collection area.

16. The apparatus as claimed in claim 15, wherein the first and second helicoidal screws have a buoyancy sufficient to float the apparatus in the liquid.

17. The apparatus as claimed in claim 15, wherein the first helicoidal screw comprises first threads with an Archimedes' screw geometry.

18. The apparatus as claimed in claim 17, wherein the second helicoidal screw comprises second threads with an Archimedes' screw geometry.

19. The apparatus as claimed in claim 15, further comprising:
   a control unit communicative with the at least one prime mover and comprising a transceiver configured to at least receive instructions to operate the at least one prime mover.

20. The apparatus as claimed in claim 15, further comprising:
   a control unit communicative with the at least one prime mover and comprising a processor and a memory having encoded thereon program code executable by the processor to instruct the at least one prime mover to move the apparatus along a defined course across a target area of the liquid.

* * * * *